United States Patent [19]
Beck

[11] Patent Number: 6,042,350
[45] Date of Patent: Mar. 28, 2000

[54] PISTON PUMP

[75] Inventor: Erhard Beck, Weilburg, Germany

[73] Assignee: ITT Manufacturing Enterprises Inc., Wilmington, Del.

[21] Appl. No.: 09/000,305

[22] PCT Filed: Jul. 11, 1996

[86] PCT No.: PCT/EP96/03029

§ 371 Date: May 4, 1998

§ 102(e) Date: May 4, 1998

[87] PCT Pub. No.: WO97/05388

PCT Pub. Date: Feb. 13, 1997

[30] Foreign Application Priority Data

Jul. 27, 1995 [DE] Germany .................. 195 27 401

[51] Int. Cl.$^7$ .................................................. F04B 53/12
[52] U.S. Cl. ................................... 417/549; 137/543.19
[58] Field of Search ................................. 417/549, 550; 137/539, 543.19

[56] References Cited

U.S. PATENT DOCUMENTS

| | | | |
|---|---|---|---|
| 1,657,131 | 1/1928 | McKissick | 137/539 |
| 1,674,718 | 6/1928 | Eisenhauer | 137/539 |
| 2,031,346 | 2/1936 | Wahlmark | 137/539 |
| 3,513,872 | 5/1970 | Tupper et al. | 137/543.19 |
| 4,071,045 | 1/1978 | Brandt | 137/528 |
| 4,365,648 | 12/1982 | Grothe | 137/539 |
| 5,823,639 | 10/1998 | Zinnkann et al. | 303/116.4 |
| 5,915,927 | 6/1999 | Kuromitsu | 417/250 |

FOREIGN PATENT DOCUMENTS

| | | |
|---|---|---|
| 0637690 | 2/1995 | European Pat. Off. . |
| 1456510 | 6/1965 | France . |
| 7225979 | 6/1972 | Germany . |
| 2624172 | 4/1977 | Germany . |
| 3112932 | 12/1982 | Germany . |
| 3236536 | 4/1984 | Germany . |
| 3520352 | 12/1986 | Germany . |
| 3742824 | 7/1989 | Germany . |
| 3808901 | 10/1989 | Germany . |
| 4333578 | 4/1994 | Germany . |
| 4242420 | 6/1994 | Germany . |
| 4310062 | 9/1994 | Germany . |
| 9319462 | 4/1995 | Germany . |
| 4439977 | 5/1995 | Germany . |
| 4407978 | 9/1995 | Germany . |

*Primary Examiner*—Charles G. Freay
*Assistant Examiner*—Robert Z. Evora
*Attorney, Agent, or Firm*—Rader, Fishman & Grauer PLLC

[57] ABSTRACT

The present invention relates to a piston pump for a hydraulic system including a cylindrical bore, a pump piston adapted to reciprocate in the cylindrical bore and bounding, as a movable wall, a working chamber, and an inlet valve which closes in the way of a non-return valve and has a closure member and a valve seat, the closure member being preloaded by a valve spring which is arranged in a spring housing that cooperates with the pump piston, on the one hand, and with a compression spring preloading the pump piston, on the other hand, wherein the spring housing is attached to the pump piston and the compression spring is attached to the spring housing, and at least one of the attachments is by way of a frictional and/or operative engagement.

8 Claims, 1 Drawing Sheet

PISTON PUMP

BACKGROUND OF THE INVENTION

The present invention relates to a piston pump for a hydraulic system including a cylindrical bore, a pump piston adapted to reciprocate in the cylindrical bore and bounding as a movable wall a working chamber, and an inlet valve which closes in the way of a non-return valve and has a closure member and a valve seat, the closure member being preloaded by a valve spring which is arranged in a spring housing that cooperates with the pump piston, on the one hand, and with a compression spring preloading the pump piston, on the other hand.

German patent application No. 42 42 420 discloses a pump of this type. The disadvantage of the prior art pump is that it comprises many individual parts, which refers especially to the pump piston. This renders the assembly difficult because mainly the valve spring urges the individual parts apart.

Therefore, an object of the present invention is to further improve upon a generic piston pump so that its assembly is facilitated and its manufacture is thus reduced in costs. An additional objective is to improve the operation of the piston pump.

SUMMARY OF THE INVENTION

This object is achieved by a pump piston with a spring housing attached to one end of the pump piston and with one end of a compression spring attached to the spring housing, wherein the end of the pump piston attached to the spring housing includes a joint chamfer which passes over into a sharp recess accomodating elements of the spring housing.

The pump piston of the pump according to the present invention can be preassembled most easily, and the inlet valve (preferably comprised of a spring housing, a closure member and a valve spring) is directly connected to the pump piston. A complete construction unit is thereby achieved which can be tested, stored and mounted into the piston pump in one part, without splitting into single parts or requiring to be supported in special mounting devices. Further, the compression spring which biasses the pump piston is secured to the piston or to the spring housing. An additional advantage is thereby achieved because the complete unit composed of the compression spring, the inlet valve and the piston can be drawn at the spring out of the housing. The connection of the individual functional elements takes place in the assembled condition by the functional elements themselves, and in first place by the pump piston, the spring housing and the compression spring which is used as a piston resetting spring. Preferably, at least one of these connections is frictional or operative. For example, the compression spring in its area connected to the spring retainer cup may be radially undersized with respect to the abutment surface on the spring retainer cup. A corresponding frictional or operative connection may also be provided between the spring retainer cup and the piston.

In order to establish a positive connection as an alternative or in addition, form-lock elements may be provided which snap into an undercut in the pump piston. To this end, the spring housing is manufactured so as to be radially undersized, and the form-lock elements may be radially outwardly or inwardly stamped projections which permit an engagement with the pump piston and the end of the compression spring.

In an aspect of the present invention, the spring housing includes web elements which carry the form-lock elements at their free ends. The web elements have a radially resilient, yielding design, thereby preventing plastic deformations when the spring housing is mounted on the pump piston. The free spaces between the web elements have correspondingly large dimensions.

It is ensured by a special surface treatment that the inwardly disposed form-lock elements will not wear off during the assembly and that frictional resistance is minimized. Favorably, the surface of the spring housing is hardened, however, in a way that the core ductility is not changed. This avoids a possible rupture of the web elements.

Advantageously, in a positive engagement between the spring housing and the piston, the pump piston has a flat jointing chamfer or expanding ramp which passes into a sharp-edged recess into which the form-lock elements can be engaged. The jointing chamfer permits smoothly expanding the web elements and thus avoids rupture of the web elements or a decline in the resilient force of the web elements.

Another advantage is that at least one opening or bore is provided in the spring housing at its end opposed to the pump piston. This increases the efficiency of the pump because throughflow is improved by this measure and rapid movements of the closure member (preferably configured as a ball) at high pump frequencies are permitted.

When the compression spring is in frictional or operative engagement with the spring housing, the compression spring at this end favorably has a conically tapered shape, with the result that the frictional connection is established. Also, it is especially important in mounting the spring that both spring ends have a conically tapering design, obviating the need to observe the direction of assembly of the compression spring.

Further advantages of the present invention can be seen in the following description, making reference to the accompanying drawings.

DETAILED DESCRIPTION OF THE DRAWINGS

Figure 1:
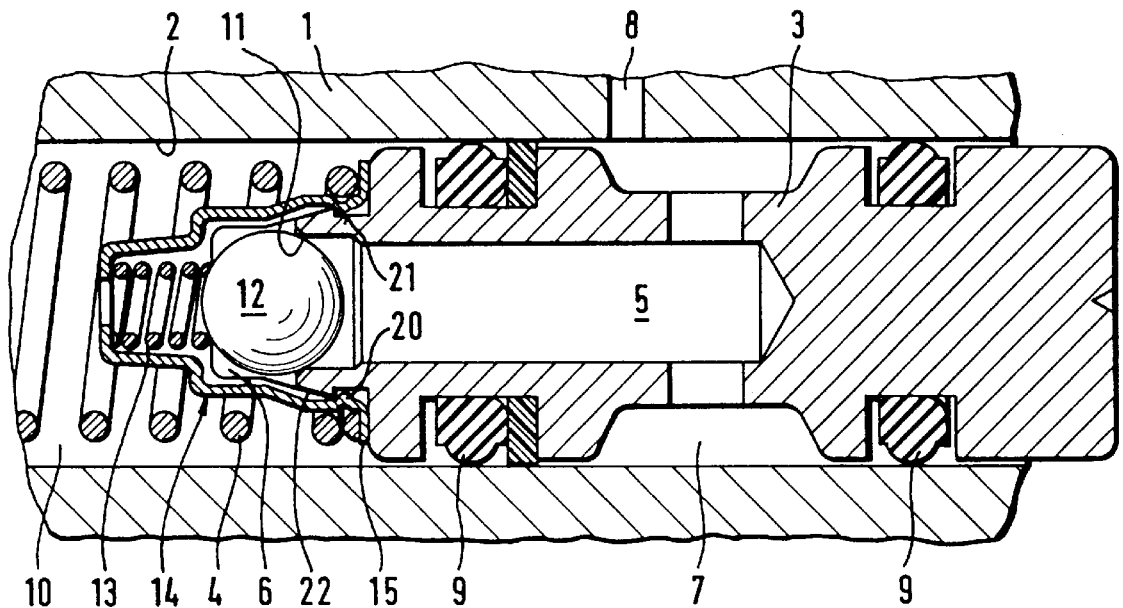
FIG. 1 is a cross-sectional, longitudinal view of the piston pump of the present invention.

FIG. 1 shows a housing 1 of a piston pump of the present invention. Housing 1 accommodates a cylindrical bore 2 in which a pump piston 3 is slidable. Pump piston 3 is driven by an eccentric (not shown) on the right-hand side in the drawing. Piston 3 is preloaded relative to the eccentric by a compression spring 4 arranged on the left-hand side of the drawing. Pump piston 3 houses a suction bore 5 which is bounded by an inlet valve 6 that closes like a non-return valve, on the one hand, and which opens into an annular chamber 7, on the other hand. Chamber 7 is connected to a pressure fluid source by way of a suction port 8. The pressure fluid source may be an unpressurized supply reservoir or any other type of pressure fluid source, for example, a pressure accumulator, or similar elements. The pump piston 3 is sealed by sealing elements 9 relative to the cylindrical bore 2 and subdivides it into the annular chamber 7 and a working chamber 10. The working chamber 10 is connected to the pressure side of a hydraulic system, which is fed by the piston pump of the present invention, by way of a pressure valve (not shown).

The inlet valve includes a valve seat 11 arranged on the pump piston 3 and a closure member 12 in abutment thereon. Closure member 12 is biassed in relation to the valve seat 11 by a valve spring 13. Valve spring 13 is supported on the bottom of a spring housing 14 which encompasses a closure member 12 (e.g. configured as a ball) and is attached to the pump piston 3. Further, the spring housing 14 has a radially outwardly projecting flange 15 which bears against an annular surface of the pump piston 3, on the one hand, and on which the compression spring 4 is supported, on the other hand.

Figure 2:
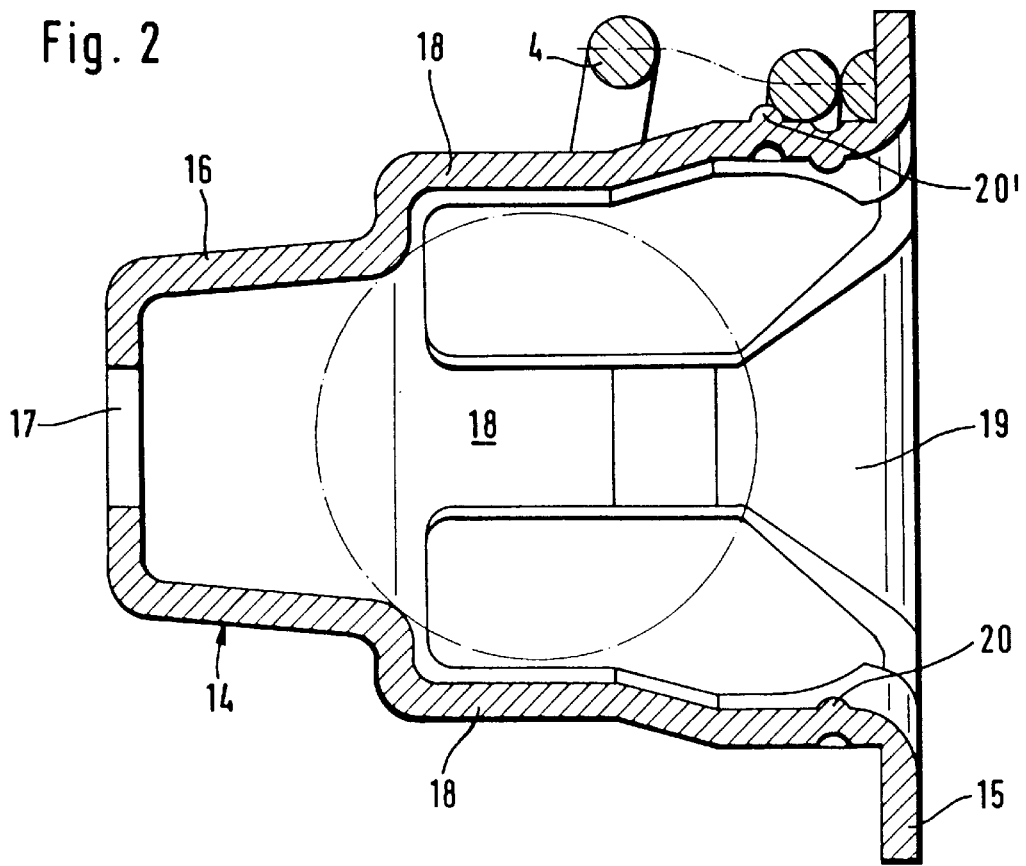
FIG. 2 is an enlarged view of the spring housing of the piston pump of FIG. 1.

FIG. 2 shows an enlarged view of the spring housing 14. According to the present invention, housing 14 includes a bowl-shaped area 16 containing in its bottom an opening 18 which permits pressure fluid flow. For example, compared to the flow of pressure fluid only by way of recesses in the peripheral surface of the spring housing 14, the efficiency of the piston pump is improved by the opening 14 especially in cold weather because quicker movements of the closure member 12 at higher pump frequencies are thereby possible. Web elements 18 are arranged at the edge of the bowl-shaped area 16. Web elements 18 extend axially with respect to the bore 2 and are enlarged towards their end 19 so that the radial projections which form the flange 15 are adjacent to each other almost without slots. However, there are large slots between the individual web elements 18 in the main area of the web elements 18. The almost planar main areas of the web elements 18 thus permit a resilient deflection in a radially outward direction. Form-lock elements 20, 20' are arranged at the ends 19 of the web elements 18. These elements are radially inwardly extending projections 20, on the one hand, and radially outwardly extending projections 20', on the other hand. The end area of the compression spring 4 makes catch at the radially outwardly extending form lock elements 20' for attachment to the spring housing 14. This arrangement is sketched as a section in the top part of FIG. 2. An alternative embodiment is shown in FIG. 1. The compression spring 4 tapers in its end area to such an extent that it abuts frictionally or operatively on the area of the end 19 of the web elements 18. The radially inwardly projecting form-lock elements 20 abut on a recess 21 in the pump piston 3, as can be seen in FIG. 1. Adjacent to the recess 21 in the direction of the working chamber 10 is a jointing chamfer 22 which is arranged at an inclination of about 15° in relation to the cylindrical axis of the bore 2.

To mount the pump piston 3, for example, the valve spring 13 and the closure member 12 are installed in the spring housing 14 which is slipped with its open end 19 onto the pump piston 3. In doing so, the form-lock elements 20 slide along the jointing chamfer 22, expand the web elements 18 radially outwardly and snap in behind the recess 21 after it is reached. The web elements 18 will spring back, and the spring housing 14 and the pump piston 3 are interconnected. Subsequently, the compression spring 4 can be fastened to the spring housing 14, either by frictional engagement or by form-locking engagement with the form-lock elements 20'.

As a preferred alternative, there is also the possibility of initially fastening the compression spring 4 to the spring housing 14 and only subsequently fastening the spring housing 14 to the pump piston 3. Spring 4 with the incorporated spring housing 14 will snap into the pump piston 3, preferably, before the spring has reached its coil-bound length. The radially undersized end area of the compression spring 4, which preferably tapers conically at least at one end, causes the ends 19 of the web elements 18 to be radially pressed against the pump piston 3. Thereby, the preassembled unit consisting of the pump piston 3, the inlet valve 6 and the compression spring 4 is reliably retained together.

It is ensured by a special surface treatment that the form-lock elements 20, 20' will not wear off in the jointing operation and that slipping on of the individual component parts takes place with minimum friction possible.

The resulting inlet valve 6, attached to the pump piston 3, is always under a preload determined by the valve spring 13, irrespective of the position of the pump piston 3 with respect to the cylindrical bore 2. Only the acceleration of the pump piston 3 is superimposed on the force exerted by the valve spring 13 (component). The effect is that the inlet valve 6 opens especially easily in the left-hand (viewed in the drawing) reversal point of the pump piston 3. This facilitates the aspiration of pressure fluid from the annular chamber 7 into the working chamber 10. This means that the dynamically lowest opening pressure prevails when the top dead center is overridden which favors good filling of the working chamber 10. This is desired in particular when the piston pump of the present invention is used to feed an electronically controlled hydraulic brake system. Systems of this type require the piston pump to develop pressure, for example, in the case of slip control or also driving stability control of the associated automotive vehicle, when no pilot pressure prevails in the annular chamber 7. Therefore, the piston pump must be able to aspirate a sufficient quantity of pressure fluid also in this case.

I claim:

1. A piston pump for a hydraulic system including:
   a pump housing;
   a cylindrical bore disposed within the pump housing,
   a pump piston adapted to reciprocate in the cylinder bore wherein the pump piston separates a working chamber from a suction chamber
   a non-return inlet valve having
      a spring housing with a radially-outward projecting flange encloses a closure member and a valve seat,
      a valve spring arranged in the spring housing cooperates with the pump piston to preload the closure member against the valve seat,
      a compression spring disposed about the spring housing preloads the radially-outward projecting flange of the spring housing against one end the pump piston, the spring housing is biased to the one end of the pump piston by the compression spring, the one end of the pump piston attached to the spring housing includes a joint chamfer which attaches into a sharp recess of a form-lock element of the spring housing.

2. The piston pump as claimed in claim 1, wherein the spring housing includes a form-lock element for retaining the compression spring.

3. The piston pump as claimed in claim 2, wherein the spring housing includes a plurality of web elements having a free end on which the form-lock elements are provided.

4. The piston pump as claimed in claim 3, wherein the free ends of the web elements have a wear-resistant and sliding surface.

5. The piston pump as claimed in claim 1, wherein the spring housing has at least one opening opposite to the pump piston.

6. The piston pump as claimed in claim 1, wherein the shape of the compression spring tapers conically at an end connected to the spring housing.

7. The piston pump as claimed in claim 1, wherein the compression spring has two conically tapered ends.

8. The piston pump as claimed in claim 1, wherein the free ends of the web elements have a sliding surface.

* * * * *